United States Patent
Odagawa

(10) Patent No.: US 8,170,117 B2
(45) Date of Patent: May 1, 2012

(54) DIGITAL BROADCAST RECEIVING APPARATUS, DIGITAL BROADCAST RECEIVING METHOD, AND STORAGE MEDIUM

(75) Inventor: Masayuki Odagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1395 days.

(21) Appl. No.: 11/695,259

(22) Filed: Apr. 2, 2007

(65) Prior Publication Data

US 2007/0250876 A1    Oct. 25, 2007

(30) Foreign Application Priority Data

Apr. 5, 2006  (JP) .................................. 2006-104470

(51) Int. Cl.
*H04N 7/12* (2006.01)
(52) U.S. Cl. .............. 375/240.25; 348/409.1; 348/415.1
(58) Field of Classification Search .............. 348/394.1, 348/409.1, 415.1
See application file for complete search history.

(56) References Cited

U.S. PATENT DOCUMENTS

| 5,327,173 | A  | * | 7/1994  | Nishizawa et al. ...... 375/240.14 |
| 5,361,096 | A  | * | 11/1994 | Ohki et al. ................. 348/386.1 |
| 2002/0122430 | A1 | * | 9/2002  | Haberman et al. ............ 370/429 |
| 2004/0003399 | A1 | * | 1/2004  | Cooper ........................... 725/38 |
| 2004/0160974 | A1 | * | 8/2004  | Read et al. ..................... 370/431 |
| 2005/0207449 | A1 | * | 9/2005  | Zhang et al. .................. 370/486 |
| 2006/0085828 | A1 | * | 4/2006  | Dureau et al. ................ 725/100 |
| 2007/0200949 | A1 | * | 8/2007  | Walker et al. ............... 348/412.1 |
| 2007/0234394 | A1 | * | 10/2007 | Skeie et al. ................... 725/120 |

FOREIGN PATENT DOCUMENTS

| JP | 9-135394 | 5/1997 |
| JP | 2003-333446 | 11/2003 |

\* cited by examiner

*Primary Examiner* — Matthew Smithers
(74) *Attorney, Agent, or Firm* — Fitzpatrick, Cella, Harper & Scinto

(57) ABSTRACT

Intra-frame prediction coding data of a channel that the viewer is not viewing is stored. When the viewer has switched channels to be viewed, the stored intra-frame prediction coding data is output during a period before intra-frame prediction coding data of the newly selected channel is received.

6 Claims, 6 Drawing Sheets

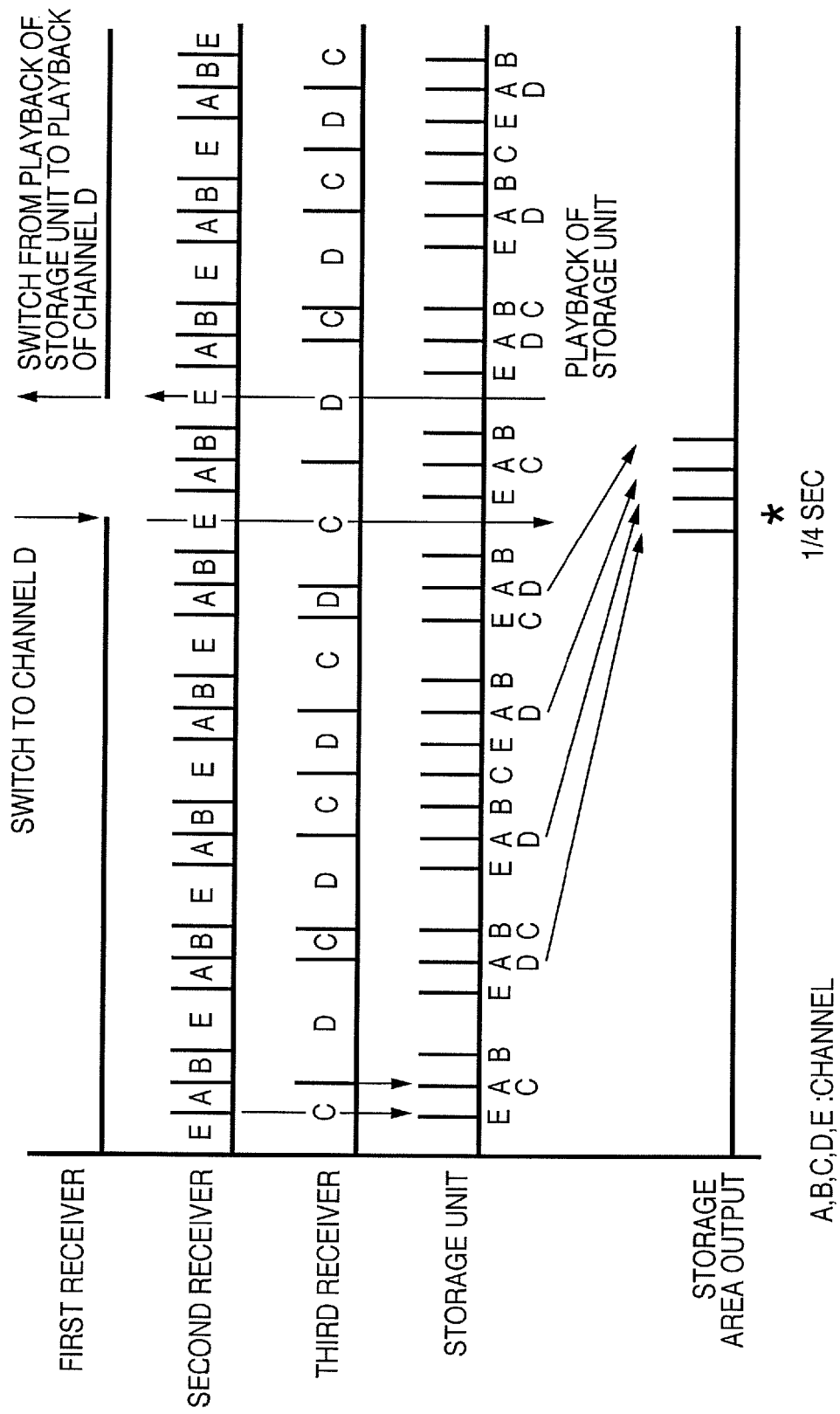
F I G. 5

DIGITAL BROADCAST RECEIVING APPARATUS, DIGITAL BROADCAST RECEIVING METHOD, AND STORAGE MEDIUM

BACKGROUND OF THE INVENTION

1. Field of the Invention

The present invention relates to a digital broadcast receiving apparatus and the like that receive a digital broadcast.

2. Description of the Related Art

Recently, video data is distributed through various media. Examples are television broadcasts using broadcasting waves and streaming broadcasts transmitted through communication lines across the Internet.

In particular, the broadcasting systems are shifting to digital broadcasts using digital television signals.

The digital broadcast uses MPEG2 as a video data coding scheme. Compared to analog broadcasts, MPEG2 takes a long time to actually output an image after video data is received and decoding is started. Accordingly, it takes a long time to output an image of a newly selected channel after the viewer has switched channels.

Japanese Patent Laid-Open No. 2003-333446, therefore, has proposed a technique that displays a still image upon channel switching, instead of a disturbed image caused by unstable synchronization upon channel switching or a blanked black image.

Also, Japanese Patent Laid-Open No. 9-135394 has proposed a technique that receives video data by a plurality of receivers and stores GOP.

Unfortunately, these conventional techniques have the following problems.

The technique disclosed in Japanese Patent Laid-Open No. 2003-333446 does not shorten the time before an image is displayed after channel switching. In other words, the length of the channel switching time remains unchanged, so the psychological burden on the viewer remains the same.

The technique disclosed in Japanese Patent Laid-Open No. 9-135394 requires an enormous storage area in order to store video data of a few seconds for each channel.

SUMMARY OF THE INVENTION

A digital broadcast receiving apparatus according to an aspect of the present invention includes a plurality of digital broadcast receivers, a plurality of decoders, a switching unit which automatically switches channels of a digital broadcast receiver, which a viewer does not normally use to view a broadcast, of the plurality of digital broadcast receivers, a storage unit which stores a plurality of intra-frame prediction coding data for each channel, a detection unit which detects reception timings of intra-frame prediction coding data for each channel, a determination unit which allocates individual channels to the plurality of digital broadcast receivers and determines a channel switching timing, based on the timings detected by the detection unit, such that the reception timings of intra-frame prediction coding data of the individual channels do not overlap, a first output unit which, when the viewer has switched channels to be viewed, outputs, from the storage unit, intra-frame prediction coding data stored immediately before switching to a newly selected channel, during a period from the point of switching to reception of intra-frame prediction coding data from the newly selected channel, and a second output unit which outputs received data from a digital broadcast receiver which the viewer normally uses to view a broadcast, during a period except for the above-mentioned period.

A digital broadcast receiving method according to another aspect of the present invention includes a switching step of automatically switching channels of a receiver, which a viewer does not normally use to view a broadcast, of a plurality of receivers, a storage step of storing a plurality of intra-frame prediction coding data for each channel in a storage unit, a detection step of detecting reception timings of intra-frame prediction coding data for each channel, a determination step of allocating individual channels to the plurality of digital broadcast receivers and determining a channel switching timing, based on the timings detected in the detection step, such that the reception timings of intra-frame prediction coding data of the individual channels do not overlap, a first output step of, when the viewer has switched channels to be viewed, outputting, from the storage unit, intra-frame prediction coding data stored immediately before switching to a newly selected channel, during a period from the point of switching to reception of intra-frame prediction coding data from the newly selected channel, and a second output step of outputting received data from a receiver which the viewer normally uses to view a broadcast, during a period except for the above-mentioned period.

A storage medium according to still another aspect of the present invention is a computer-readable storage medium characterized by storing a program for causing a computer to execute a switching step of automatically switching channels of a receiver, which a viewer does not normally use to view a broadcast, of a plurality of receivers, a storage step of storing a plurality of intra-frame prediction coding data for each channel in a storage unit, a detection step of detecting reception timings of intra-frame prediction coding data for each channel, a determination step of allocating individual channels to the plurality of digital broadcast receivers and determining a channel switching timing, based on the timings detected by the detection step, such that the reception timings of intra-frame prediction coding data of the individual channels do not overlap, a first output step of, when the viewer has switched channels to be viewed, outputting, from the storage unit, intra-frame prediction coding data stored immediately before switching to a newly selected channel, during a period from the point of switching to reception of intra-frame prediction coding data from the newly selected channel, and a second output step of outputting received data from a receiver which the viewer normally uses to view a broadcast, during a period except for the above-mentioned period.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a timing chart showing a channel switching operation.

DESCRIPTION OF THE EMBODIMENT

Figure 1:
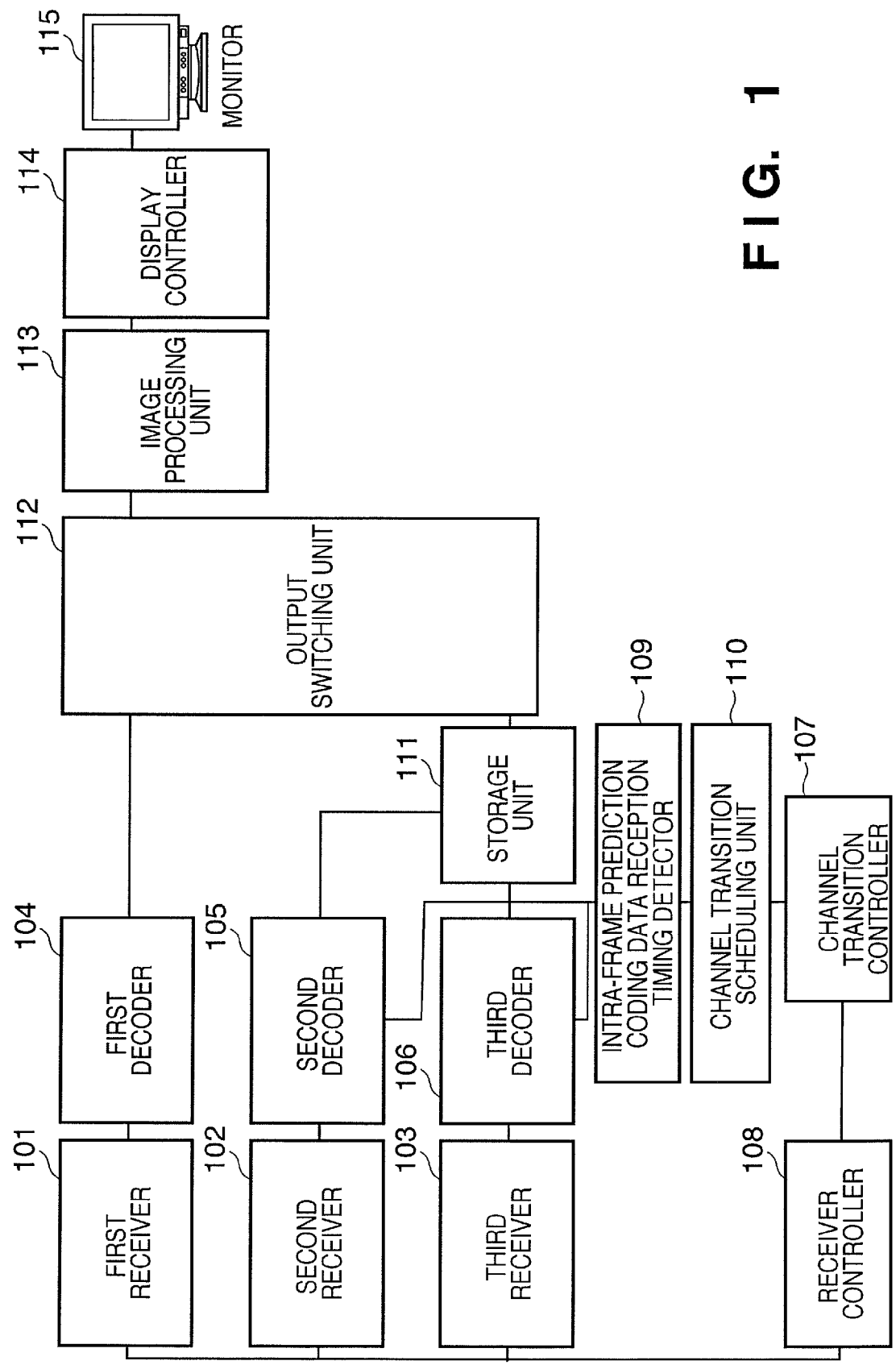
FIG. 1 is a schematic block diagram showing the arrangement of a digital broadcast receiving apparatus according to an aspect of the present invention.
Figure 2:
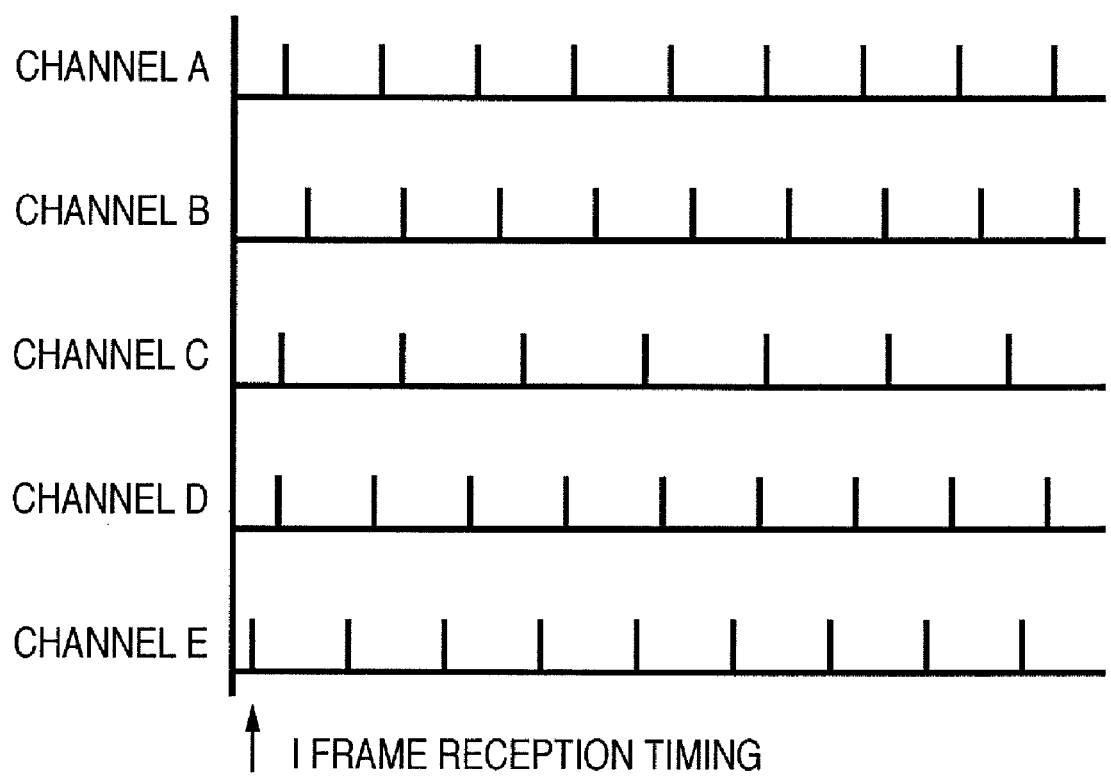
FIG. 2 is a timing chart showing the intra-frame coding data reception timings of each channel.
Figure 3A:
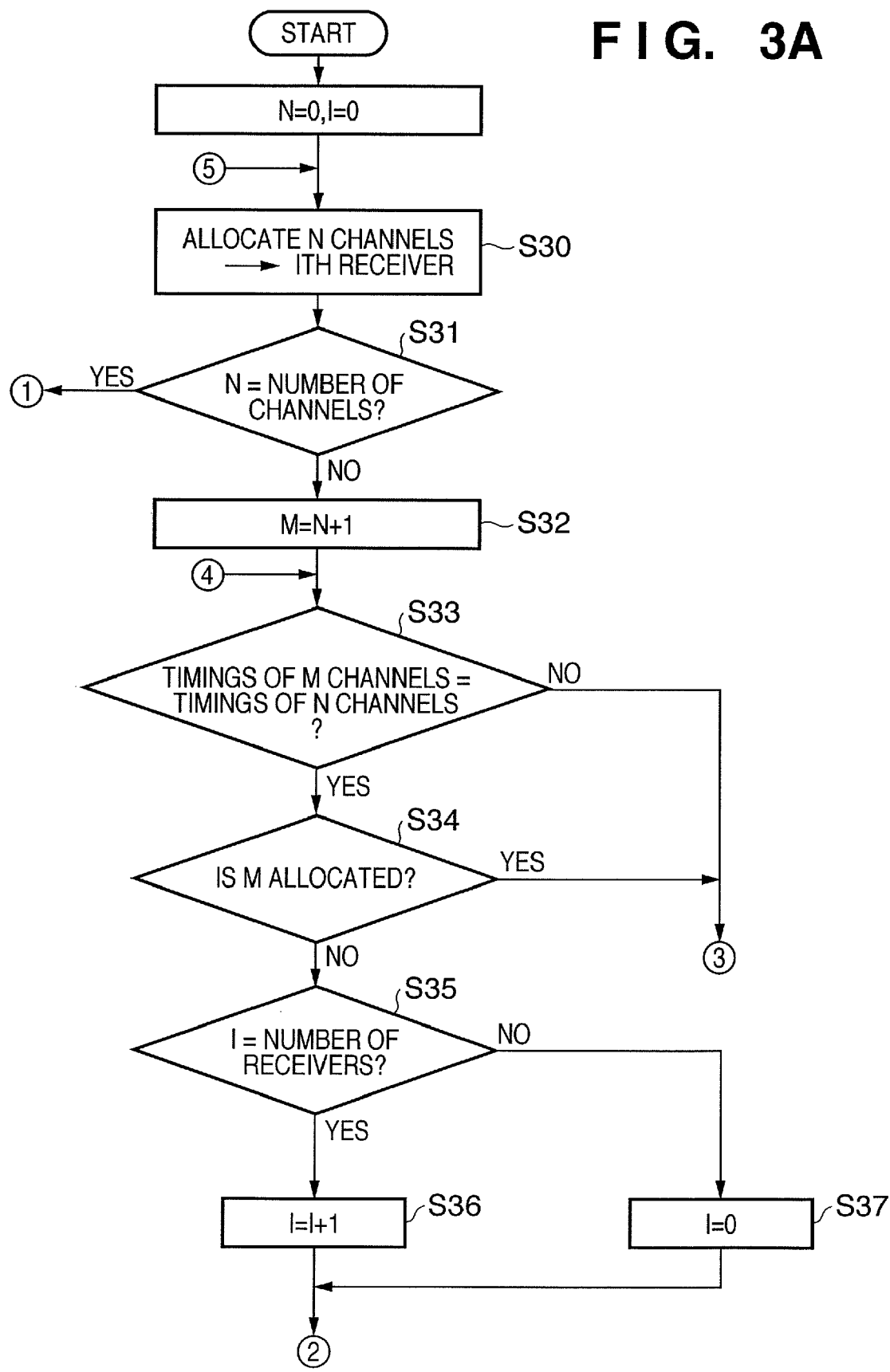
FIGS. 3A and 3B are flowcharts showing a process of allocating channels to receivers in the present invention.
Figure 3B:
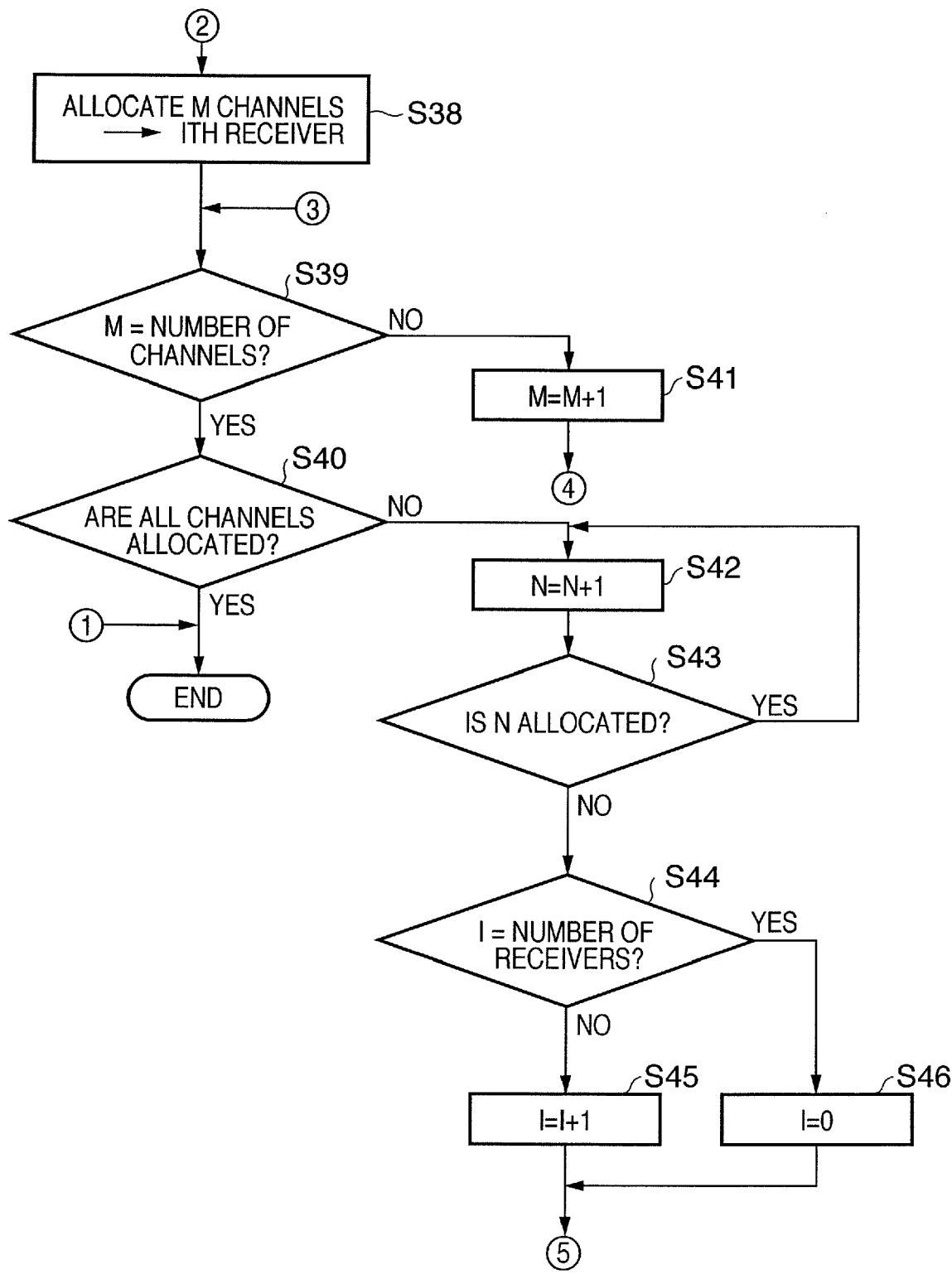
Figure 4:
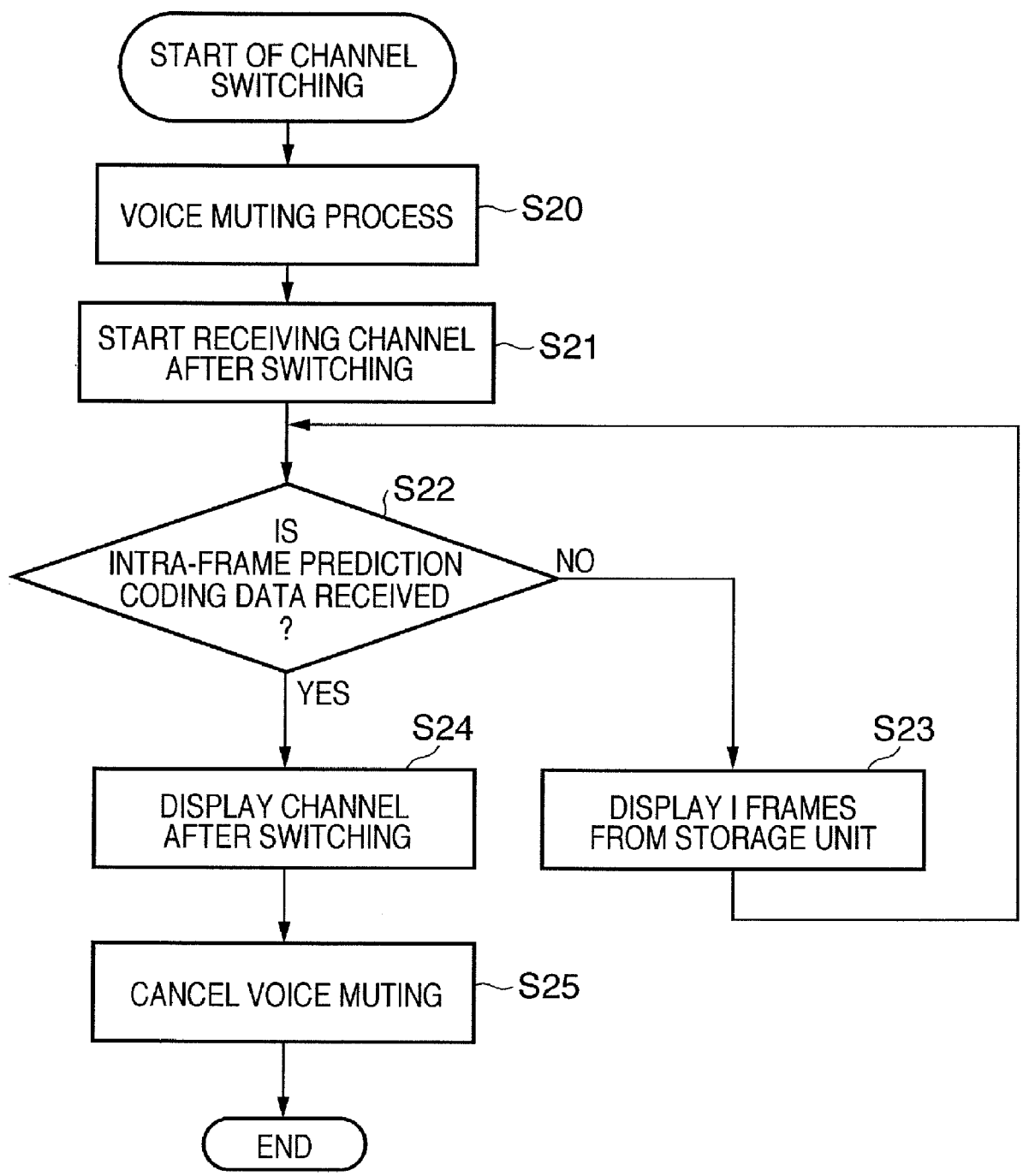
FIG. 4 is a flowchart showing a channel switching process.

An embodiment of the present invention will be explained below with reference to the accompanying drawings. FIG. 1 is a schematic block diagram showing the arrangement of a digital broadcast receiving apparatus according to an aspect of the present invention. FIG. 2 is a timing chart showing intra-frame coding data reception timings. FIGS. 3A and 3B are flowcharts showing a process of allocating channels to receivers in the present invention. FIG. 4 is a flowchart showing a channel switching process. FIG. 5 is a timing chart showing a channel switching operation.

Referring to FIG. 1, first, second, and third receivers 101, 102, and 103 each selectively receive a radio wave (broadcast wave) having a predetermined frequency from digital broadcast waves transmitted via an antenna or cable. Each of the first to third receivers 101 to 103 also demodulates the received radio wave, corrects errors, and, if necessary, cancels scramble for limited reception. The first to third receivers 101 to 103 each generate a transport stream (TS) from the received broadcast wave, and separates the TS into video data, voice data, data broadcast data, and related data attached to these data.

Of the first to third receivers 101 to 103, the first receiver 101 is a receiver that the viewer normally uses to view a broadcast.

A first decoder 104 receives the video data, the voice data, the data broadcast data, and the related data attached to these data from the first receiver 101, and decodes the received data.

Second and third decoders 105 and 106 respectively receive the video data from the second and third receivers 102 and 103, and decode the received data.

A channel transition controller 107 automatically switches channels of the second and third receivers 102 and 103.

In accordance with timings detected by an intra-frame prediction coding data reception timing detector 109, the channel transition controller 107 instructs a receiver controller 108 to switch to the next channel.

The present embodiment will be explained by using an I picture of MPEG2 as intra-frame prediction coding data.

In accordance with the instruction from the channel transition controller 107, the receiver controller 108 changes the channels of the second and third receivers 102 and 103.

The intra-frame prediction coding data reception timing detector 109 detects the reception periods and timings of intra-frame prediction coding data of channels received by the second and third receivers 102 and 103.

A channel transition scheduling unit 110 performs processing based on the reception periods and timings of intra-frame prediction coding data of channels detected by the intra-frame prediction coding data reception timing detector 109. Also, the channel transition scheduling unit 110 allocates channels to the second and third receivers 102 and 103 so as to maximize intra-frame prediction coding data received by the second and third receivers 102 and 103.

A storage unit 111 stores I frames decoded by the second and third decoders 105 and 106.

The storage unit 111 can store n I frames for each channel. If the number of I frames exceeds n, the storage unit 111 erases the oldest I frame and stores a new I frame.

The present embodiment will be explained by assuming that n is 8.

An output switching unit 112 switches outputs to an image processing unit 113. While the viewer is normally viewing a broadcast, an image decoded by the first decoder 104 is output to the image processing unit 113. When the viewer switches channels, I frames stored in the storage unit 111 and corresponding to the new channel are sequentially output from the oldest one to the image processing unit 113, during a period before I frames of the new channel are received.

The image processing unit 113 converts the tone, resolution, and rate, and performs an image quality improving process suited to each video data.

A display controller 114 outputs the video image processed by the image processing unit 113 to a monitor 115.

The operation of allocating channels to the second and third receivers 102 and 103 in the present invention will be explained below with reference to FIGS. 2, 3A and 3B.

When the digital broadcast receiving apparatus is powered on, the channel transition controller 107 automatically starts switching channels of the second and third receivers.

In the initial state, the I frame reception period and timings of each channel detected by the intra-frame prediction coding data reception timing detector 109 are unknown.

Accordingly, the channel transition controller 107 sequentially switches all channels from the first one.

When the infra-frame prediction coding data reception timing detector 109 detects the I frame reception period and timings of each channel, the channel transition scheduling unit 110 starts allocating channels in accordance with the flowchart shown in FIGS. 3A and 3B.

Assume that in the present embodiment, I frames of individual channels can be received at the periods and timings shown in FIG. 2.

As shown in FIG. 2, I frames are normally periodically transmitted. Generally, an I frame is transmitted once for 15 frames.

Also, the I frame transmission timings of different channels do not generally synchronize.

When the channel allocation starts, first channel A is allocated to the second receiver 102 (step S30).

Then, channel D having the same I frame reception period and timings as channel A is allocated to the third receiver 103 (steps S31 to S41).

After that, channel B is allocated to the second receiver 102 (steps S42 to S30).

Similarly, channel C is allocated to the third receiver 103, and channel E is allocated to the second receiver 102.

The channel transition scheduling unit 110 notifies the channel transition controller 107 of the channel allocation results and the I frame reception timings of the individual channels.

In synchronization with the I frame reception timings of the individual channels notified by the channel transition scheduling unit 110, the channel transition controller 107 instructs the receiver controller 108 to switch channels.

The channel switching operation of the present invention will be explained below with reference to FIGS. 4 and 5.

When the viewer has switched channels, voice muting (a voice muting process) is performed (step S20), and the first receiver 101 starts receiving the channel (the channel after the switching) designated by the viewer (step S21).

Then, whether I frames (intra-frame prediction coding data) of the new channel are received is determined (step S22). Since no I frames of a new channel are normally received immediately after channel switching, the output switching unit 112 switches to the output from the storage unit 111.

The storage unit 111 outputs the oldest one of I frames corresponding to the new channel. The output I frame is displayed on the monitor 115 and deleted from the storage unit 111 (step S23).

Step S22 is executed ¼ second after the I frame is output from the storage unit 111.

The storage unit 111 stores eight I frames for each channel, and hence can output an image for a maximum of two seconds.

If it is determined in step S22 that I frames of the new channel are received, the output switching unit 112 switches to the output from the first decoder 104, and the monitor 115 displays the channel after the switching (step S24).

After this video output switching, the voice muting is canceled (step S25), thereby completing the channel switching.

In the present embodiment, the first to third receivers 101 to 103 and the first to third decoders 104 to 106 are incorporated into the same apparatus. However, these receivers and decoders may also be installed in different apparatuses.

In the present embodiment, only I frames are saved for all channels. However, it is also possible to include P frames following I frames as save units. A save unit may also be selected for each channel.

The embodiment of the present invention can be implemented by, for example, executing a program by a computer. A means for supplying the program to the computer, e.g., a computer-readable recording medium such as a CD-ROM recording the program or a transmission medium such as the Internet that transmits the program is also applicable as an embodiment of the present invention. The program itself can also be applied as an embodiment of the present invention. The scope of the present invention includes the program, recording medium, and transmission medium described above, and a program product.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-104470 filed on Apr. 5, 2006, which is hereby incorporated by reference herein in its entirety.

What is claimed is:

1. A digital broadcast receiving apparatus comprising:
a plurality of digital broadcast receivers;
a plurality of decoders;
a switching unit which automatically switches channels of a digital broadcast receiver, which a viewer does not normally use to view a broadcast, of said plurality of digital broadcast receivers;
a storage unit which stores a plurality of intra-frame prediction coding data for each channel;
a detection unit which detects reception timings of intra-frame prediction coding data for each channel;
a determination unit which allocates individual channels to said plurality of digital broadcast receivers and determines a channel switching timing, based on the timings detected by said detection unit, such that the reception timings of intra-frame prediction coding data of the individual channels do not overlap;
a first output unit which, when the viewer has switched channels to be viewed, outputs, from said storage unit, intra-frame prediction coding data stored immediately before switching to a newly selected channel, during a period from the point of switching to reception of intra-frame prediction coding data from the newly selected channel;
a second output unit which outputs received data from a digital broadcast receiver which the viewer normally uses to view a broadcast, during a period except for the period;
a save unit which selectively saves or deletes inter-frame prediction coding data for each channel; and
a third output unit which outputs the inter-frame prediction coding data together with the intra-frame prediction coding data while the save unit is saving the inter-frame prediction coding data.

2. A digital broadcast receiving apparatus comprising:
a plurality of digital broadcast receivers;
a plurality of decoders;
a switching unit which automatically switches channels of a digital broadcast receiver, which a viewer does not normally use to view a broadcast, of said plurality of digital broadcast receivers;
a storage unit which stores a plurality of intra-frame prediction coding data for each channel;
a detection unit which detects reception timings of intra-frame prediction coding data for each channel;
a determination unit which allocates individual channels to said plurality of digital broadcast receivers and determines a channel switching timing, based on the timings detected by said detection unit, such that the reception timings of intra-frame prediction coding data of the individual channels do not overlap;
a first output unit which, when the viewer has switched channels to be viewed, outputs, from said storage unit, intra-frame prediction coding data stored immediately before switching to a newly selected channel, during a period from the point of switching to reception of intra-frame prediction coding data from the newly selected channel; and
a second output unit which outputs received data from a digital broadcast receiver which the viewer normally uses to view a broadcast, during a period except for the period,
wherein the channel switching timing is determined by predicting a next reception timing of the intra-frame prediction coding data from a last reception timing of the intra-frame prediction coding data, by using the intra-frame prediction coding data which is periodically transmitted.

3. A digital broadcast receiving method comprising:
a switching step of automatically switching channels of a receiver, which a viewer does not normally use to view a broadcast, of a plurality of receivers;
a storage step of storing a plurality of intra-frame prediction coding data for each channel in a storage unit;
a detection step of detecting reception timings of intra-frame prediction coding data for each channel;
a determination step of allocating individual channels to the plurality of digital broadcast receivers and determining a channel switching timing, based on the timings detected in the detection step, such that the reception timings of intra-frame prediction coding data of the individual channels do not overlap;
a first output step of, when the viewer has switched channels to be viewed, outputting, from the storage unit, intra-frame prediction coding data stored immediately before switching to a newly selected channel, during a period from the point of switching to reception of intra-frame prediction coding data from the newly selected channel;
a second output step of outputting received data from a receiver which the viewer normally uses to view a broadcast, during a period except for the period;
a save step of selectively saving or deleting inter-frame prediction coding data for each channel; and a third output step of outputting the inter-frame prediction coding data together with the intra-frame prediction coding data while the save step is saving the inter-frame prediction coding data.

4. A non-transitory computer-readable storage medium storing a program for causing a computer to execute a method according to claim 3.

5. A digital broadcast receiving method comprising:
a switching step of automatically switching channels of a receiver, which a viewer does not normally use to view a broadcast, of a plurality of receivers;
a storage step of storing a plurality of intra-frame prediction coding data for each channel in a storage unit;
a detection step of detecting reception timings of intra-frame prediction coding data for each channel;
a determination step of allocating individual channels to the plurality of digital broadcast receivers and determining a channel switching timing, based on the timings detected in the detection step, such that the reception timings of intra-frame prediction coding data of the individual channels do not overlap;
a first output step of, when the viewer has switched channels to be viewed, outputting, from the storage unit, intra-frame prediction coding data stored immediately before switching to a newly selected channel, during a period from the point of switching to reception of intra-frame prediction coding data from the newly selected channel; and
a second output step of outputting received data from a receiver which the viewer normally uses to view a broadcast, during a period except for the period,
wherein the channel switching timing is determined by predicting a next reception timing of the intra-frame prediction coding data from a last reception timing of the intra-frame prediction coding data, by using the intra-frame prediction coding data which is periodically transmitted.

6. A non-transitory computer-readable storage medium storing a program for causing a computer to execute a method according to claim 5.

* * * * *